US008253720B2

(12) United States Patent
Huang

(10) Patent No.: US 8,253,720 B2
(45) Date of Patent: Aug. 28, 2012

(54) LIQUID CRYSTAL DISPLAY WITH ALTERNATING CURRENT OFF CONTROL CIRCUIT

(75) Inventor: Shun-Ming Huang, Shenzhen (CN)

(73) Assignees: Innocom Technology (Shenzhen) Co., Ltd., Shenzhen, Guangdong Province (CN); Chimei Innolux Corporation, Miaoli County (TW)

( * ) Notice: Subject to any disclaimer, the term of this patent is extended or adjusted under 35 U.S.C. 154(b) by 1136 days.

(21) Appl. No.: 12/152,998

(22) Filed: May 19, 2008

(65) Prior Publication Data

US 2008/0284772 A1 Nov. 20, 2008

(30) Foreign Application Priority Data

May 18, 2007 (CN) .......................... 2007 1 0074366

(51) Int. Cl.
*G06F 3/038* (2006.01)
*G09G 5/00* (2006.01)
*G09G 3/36* (2006.01)

(52) U.S. Cl. .......................................... 345/211; 345/87

(58) Field of Classification Search ............ 345/87–104, 345/204–215
See application file for complete search history.

(56) References Cited

U.S. PATENT DOCUMENTS

| | | | | |
|---|---|---|---|---|
| 5,218,235 | A * | 6/1993 | Patterson et al. | 307/39 |
| 6,762,742 | B2 * | 7/2004 | Moon et al. | 345/102 |
| 6,809,716 | B1 | 10/2004 | Kim | |
| 7,330,003 | B2 * | 2/2008 | Zhou et al. | 315/318 |
| 2002/0086651 | A1 * | 7/2002 | Prentice et al. | 455/234.1 |
| 2004/0257326 | A1 | 12/2004 | Chang | |
| 2005/0201123 | A1 * | 9/2005 | Usui et al. | 363/16 |
| 2005/0242789 | A1 * | 11/2005 | Kang | 323/224 |
| 2006/0267922 | A1 * | 11/2006 | Kim | 345/102 |
| 2007/0188112 | A1 * | 8/2007 | Kang et al. | 315/291 |

FOREIGN PATENT DOCUMENTS

JP 2003134816 A * 5/2003

* cited by examiner

*Primary Examiner* — Amare Mengistu
*Assistant Examiner* — Patrick F Marinelli
(74) *Attorney, Agent, or Firm* — Muncy, Geissler, Olds & Lowe, PLLC

(57) ABSTRACT

An exemplary liquid crystal display includes a power supply circuit, a scaler, and an alternating current off control circuit connected between the power supply circuit and the scaler. The alternating current off control circuit is configured to detect an operation state of the power supply circuit, and output a corresponding control signal to the scaler.

7 Claims, 3 Drawing Sheets

LIQUID CRYSTAL DISPLAY WITH ALTERNATING CURRENT OFF CONTROL CIRCUIT

FIELD OF THE INVENTION

The present invention relates to liquid crystal displays (LCDs), and particularly to an LCD with an alternating current off control circuit.

GENERAL BACKGROUND

A typical LCD has the advantages of portability, low power consumption, and low radiation. Therefore, the LCD has been widely used in various portable information products, such as notebooks, personal digital assistants, video cameras, and the like.

FIG. 5 is a block diagram of a typical LCD. The LCD 100 includes a power supply circuit 11, a scaler 15, an LCD panel 16, an inverter 17, and a backlight module 18. The power supply circuit 11 is used for transforming external alternating current (AC) voltages into direct current (DC) voltages. The DC voltages are transmitted to the LCD panel 16, the scaler 15, and the inverter 17, respectively. The scaler 15 is used for receiving external video signals and generating control signals. The video signals are transmitted to the LCD panel 16, and the control signals are transmitted to the LCD panel 16, the power supply circuit 11, and the inverter 17, respectively. The inverter 17 is used for transforming the DC voltages into high-frequency AC voltages, and the high-frequency AC voltages are used for driving lamps (not shown) of the backlight module 18 to light up.

Shutting down the LCD 100 should be done by pressing a mechanical switch (not shown) located on a housing (not shown) of the LCD 100. When the mechanical switch is pressed, the mechanical switch transmits a control signal to the scaler 15. Firstly, the scaler 15 transmits a first shutting down signal to shut down the inverter 17. Then, the scaler 15 stops transmitting the video signals to the LCD panel 16. Finally, the scaler 15 transmits a second shutting down signal to shut down the power supply circuit 11. The entire operation above is called "DC off."

When the mechanical switch is not pressed and the external AC voltage suddenly drops to zero, the power supply circuit 11, the inverter 17, and the scaler 15 are shut down at the same time, as shown in FIG. 6. This is called "AC off." If AC off occurs many times, electrical elements of the LCD 100 are liable to be damaged or even destroyed.

What is needed, therefore, is an LCD that can overcome the above-described deficiencies.

SUMMARY

In one aspect, a liquid crystal display includes a power supply circuit, a scaler, and an alternating current off control circuit connected between the power supply circuit and the scaler. The alternating current off control circuit is configured to detect an operation state of the power supply circuit, and output a corresponding control signals to the scaler.

In another aspect, a liquid crystal display includes a power supply circuit, a scaler, and an alternating current off control circuit. When an associated external alternating current voltage suddenly drops to zero, the alternating current off control circuit is configured to output a corresponding control signal to the scaler, and the scaler is configured to control the liquid crystal display to shut down according to a direct current off procedure.

Other novel features and advantages will become more apparent from the following detailed description when taken in conjunction with the accompanying drawings.

DETAILED DESCRIPTION OF PREFERRED EMBODIMENTS

Reference will now be made to the drawings to describe preferred and exemplary embodiments in detail.

Figure 1:
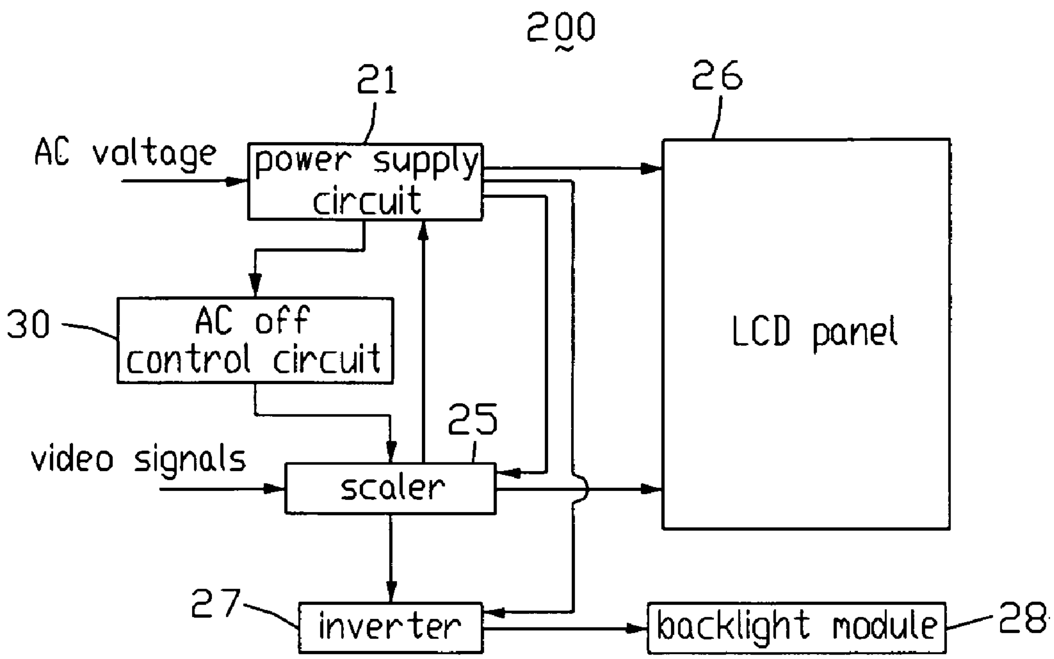
FIG. 1 is a block diagram of an LCD according to an exemplary embodiment of the present invention, the LCD including an AC off control circuit.

FIG. 1 is a block diagram of an LCD according to an exemplary embodiment of the present invention. The LCD 200 includes a power supply circuit 21, a scaler 25, an LCD panel 26, an inverter 27, a backlight module 28, and an AC off control circuit 30. The power supply circuit 21 is used for transforming external AC voltages into DC voltages. The DC voltages are transmitted to the LCD panel 26, the scaler 25, and the inverter 27, respectively. The scaler 25 is used for receiving external video signals and generating control signals. The video signals are transmitted to the LCD panel 26, and the control signals are transmitted to the LCD panel 26, the power supply circuit 21, and the inverter 27, respectively. The inverter 27 is used for transforming the DC voltages into high-frequency AC voltages, and the high-frequency AC voltages are used for driving lamps (not shown) of the backlight module 28 to light up. The AC off control circuit 30 is connected between the power supply circuit 21 and the scaler 25.

Figure 2:
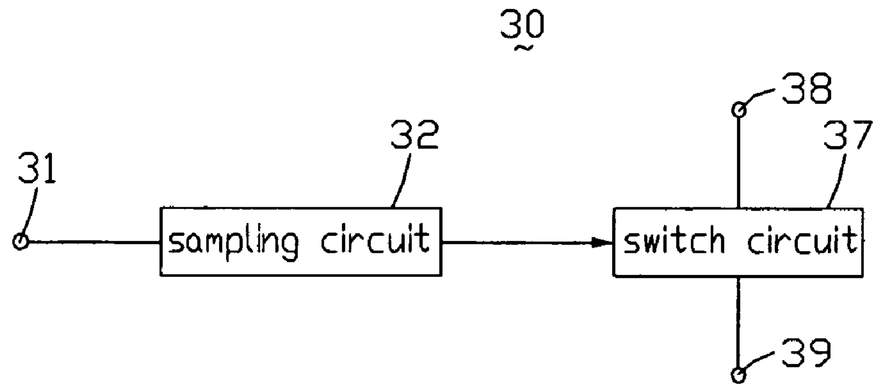
FIG. 2 is a block diagram of the AC off control circuit of FIG. 1, the AC off control circuit including a sampling circuit and a switch circuit.

FIG. 2 is a block diagram of the AC off control circuit 30. The AC off control circuit 30 includes an input terminal 31, a sampling circuit 32, a switch circuit 37, a control terminal 38, and an output terminal 39. The input terminal 31 is connected to the power supply circuit 21. The control terminal 38 is connected to a DC voltage source (not shown). The output terminal 39 is connected to the scaler 25. The sampling circuit 32 transforms input signals of the input terminal 31 into control signals, to turn on or turn off the switch circuit 37. When the switch circuit 37 is turned on, the control terminal 38 is connected to the output terminal 39.

Figure 3:
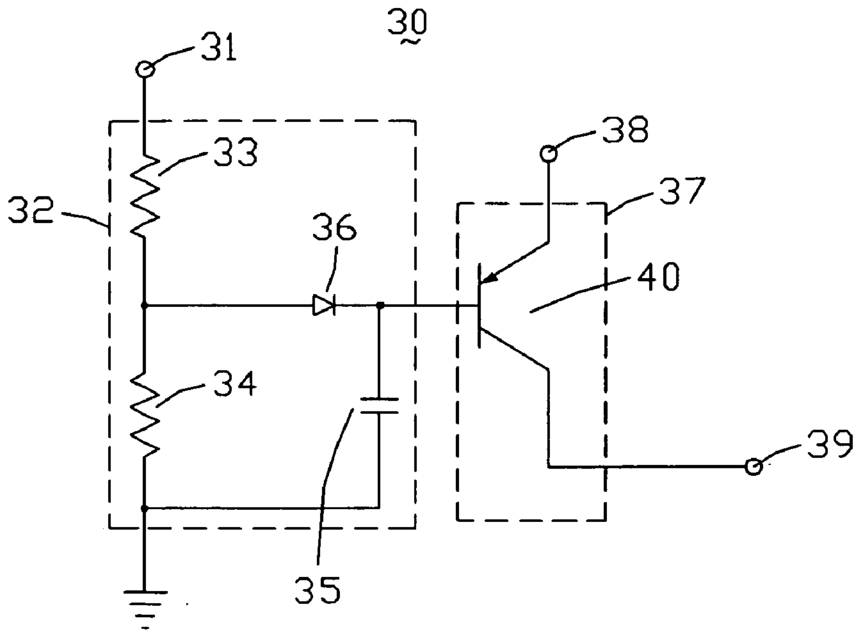
FIG. 3 is a diagram of details of the sampling circuit and the switch circuit of FIG. 2.

FIG. 3 is a diagram of details of the sampling circuit 32 and the switch circuit 37. The sampling circuit 32 includes a voltage division circuit (not labeled) and a commutating and filter circuit (not labeled). The voltage division circuit includes a first resistor 33 and a second resistor 34. The commutating and filter circuit includes a capacitor 35 and a diode 36. The switch circuit 37 includes a transistor 40, and the transistor 40 is typically a positive-negative-positive (PNP) bipolar transistor. An anode of the diode 36 is connected to the input terminal 31 via the first resistor 33, and is also connected to ground via the second resistor 34. A cathode of the diode 36 is connected to a base electrode of the transistor 40, and is also connected to ground via the capacitor 35. An emitter electrode of the transistor 40 is connected to the control terminal 38, and a collector electrode of the transistor 40 is connected to the output terminal 39.

When the LCD 200 works normally, the input terminal 31 receives an AC voltage from the power supply circuit 21. The sampling circuit 32 transforms the AC voltage into a DC voltage. A value of the DC voltage is higher than a value of the DC voltage source, thus the transistor 40 is turned off.

Figure 4:
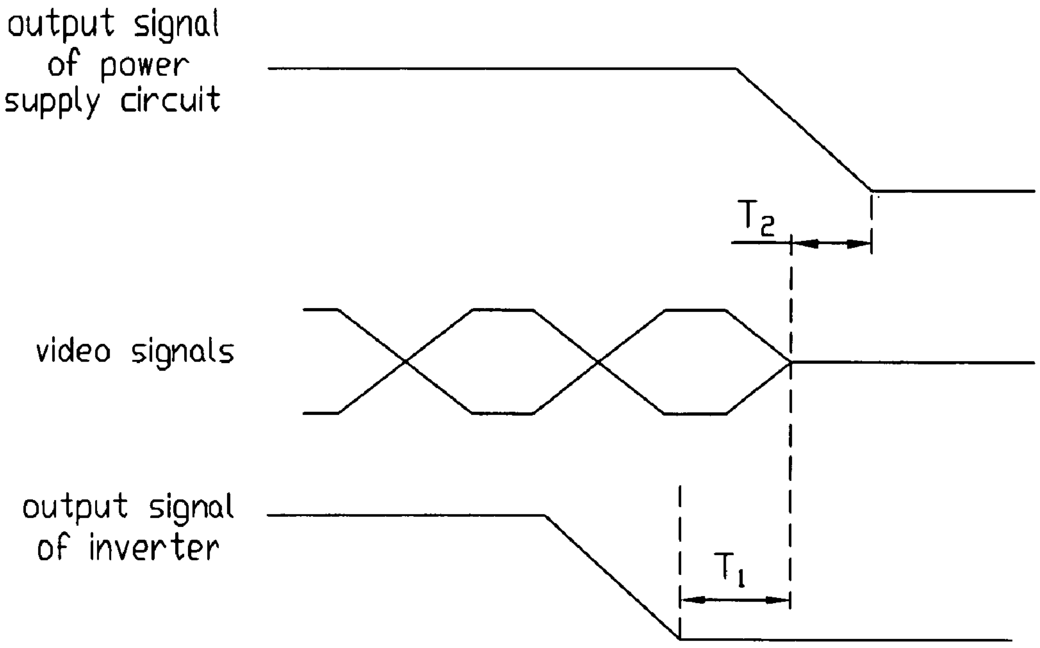
FIG. 4 is a waveform diagram illustrating an AC off procedure for the LCD of FIG. 1.
Figure 5:
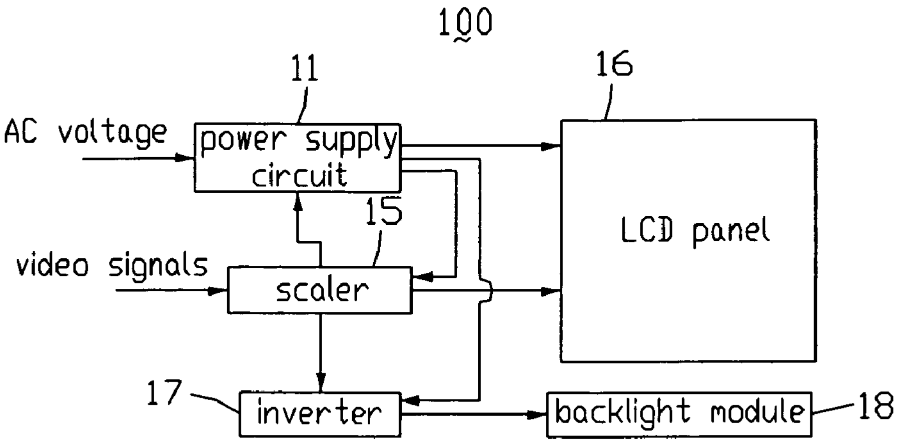
FIG. 5 (RELATED ART)
FIG. 5 is a block diagram of a conventional LCD.
Figure 6:
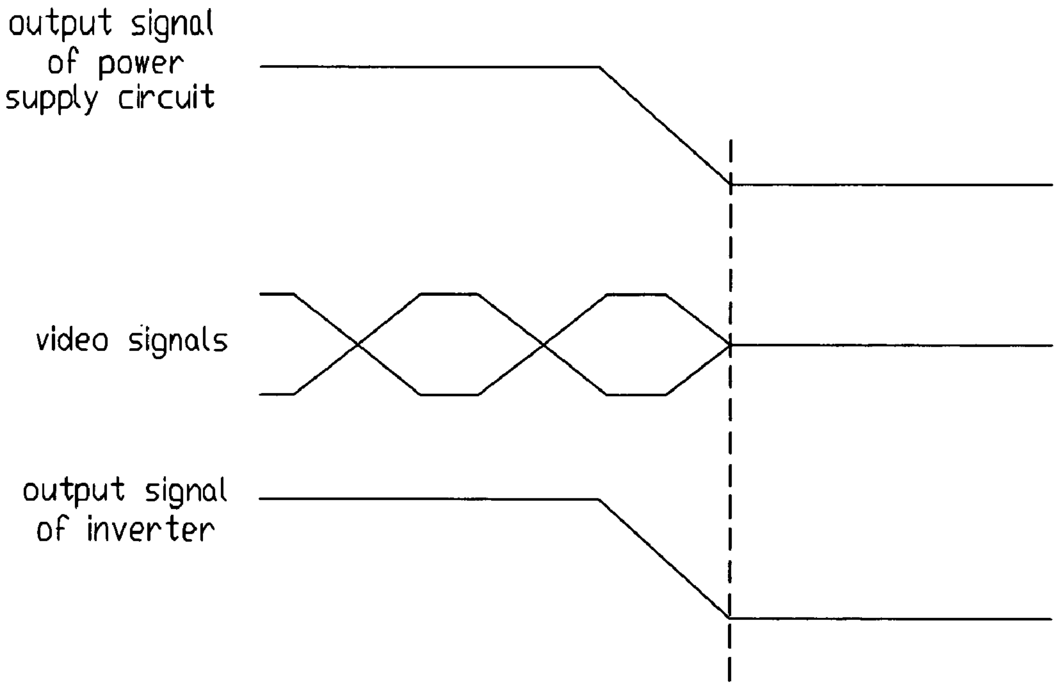
FIG. 6 (RELATED ART)
FIG. 6 is a waveform diagram illustrating a DC off procedure for the LCD of FIG. 5.

When the external AC voltage suddenly drops to zero, the AC voltage received by the input terminal 31 decreases rapidly. The DC voltage decreases correspondingly. When the value of the DC voltage is lower than the value of the DC voltage source, the transistor 40 is turned on. The DC voltage source outputs a DC voltage to the scaler 25 via the control terminal 38, the actived transistor 40, and the output terminal 39. The scaler 25 firstly transmits a first shutting down signal to the inverter 27 in order to shut down the inverter 27. After a short time T1, as shown in FIG. 4, the scaler 25 stops transmitting the video signals to the LCD panel 26. T1 can for example be 50 ms. After another short time T2, as shown in FIG. 4, the scaler 25 transmits a second shutting down signal to shut down the power supply circuit 21. T2 can for example be 30 ms.

That is, the AC off control circuit 30 switches what would otherwise be an AC off procedure to a DC off procedure. Thus, a risk of electrical elements of the LCD 200 being damaged or even destroyed due to repeated AC off occurrences is effectively eliminated.

In alternative embodiments, the transistor 40 can be a P-channel metal-oxide-semiconductor field effect transistor (P-MOSFET). In such case, a gate electrode of the P-MOSFET is connected to the cathode of the diode 36, a source electrode of the P-MOSFET is connected to the control terminal 38, and a drain electrode of the P-MOSFET is connected to the output terminal 39. The AC off control circuit 30 can be integrally packaged in the power supply circuit 21 or in the scaler 25.

It is to be further understood that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal display, comprising:

a power supply circuit;

a scaler; and an alternating current off control circuit;

wherein when an associated external alternating current voltage suddenly drops to zero, the alternating current off control circuit is configured to output a corresponding control signal to the scaler, and the scaler is configured to control the liquid crystal display to shut down according to a direct current off procedure;

wherein the alternating current off control circuit comprises an input terminal, a first resistor, a second resistor, a capacitor, a diode, a switch circuit, a control terminal and an output terminal, the input terminal is connected to the power supply circuit and receives an external alternating current voltage via the power supply circuit, an anode of the diode is connected to the input terminal via the first resistor and connected to ground via the second resistor, a cathode of the diode is connected to ground via the capacitor and connected to the switch circuit, the switch circuit is connected to a direct current voltage source via the control terminal, and the switch circuit is connected to the scaler via the output terminal;

wherein the first resistor, the second resistor, the capacitor and the diode transform the external alternating current voltage into a direct current voltage;

in a situation that the power supply circuit operates normally, the switch circuit is turned off;

in a situation that the external alternating current voltage drops to about zero volts, the switch circuit is turned on, and the decreased direct current voltage is provided to the scaler via the output terminal;

wherein an inverter is configured to receive direct current voltages from the power supply circuit, control signals from the scaler, and transform the direct current voltages into a high-frequency alternating current voltage;

wherein when the scaler receives a decreased direct current voltage from the alternating current off control circuit, the scaler transmits a first shutting down signal to the inverter to shut down the inverter, and after a first time, the scaler stops transmitting video signals to a liquid crystal display panel, and after a second time, the scaler transmits a second shutting down signal to shut down the power supply circuit.

2. The liquid crystal display of claim 1, wherein the switch circuit is a PNP bipolar transistor, a base electrode of the PNP bipolar transistor is connected to the cathode of the diode, an emitter electrode of the PNP bipolar transistor is connected to the control terminal, and a collector electrode of the PNP bipolar transistor is connected to the output terminal.

3. The liquid crystal display of claim 1, wherein the switch circuit is a P-channel metal-oxide-semiconductor field effect transistor, a gate electrode of the P-channel metal-oxide-semiconductor field effect transistor is connected to the cathode of the diode, a source electrode of the P-channel metal-oxide-semiconductor field effect transistor is connected to the control terminal, and a drain electrode of the P-channel metal-oxide-semiconductor field effect transistor is connected to the output terminal.

4. The liquid crystal display of claim 1, wherein the alternating current off control circuit is packaged in the power supply circuit.

5. The liquid crystal display of claim 1, wherein the alternating current off control circuit is packaged in the scaler.

6. The liquid crystal display of claim 1, wherein the first time is about 50 ms.

7. The liquid crystal display of claim 1, wherein the second time is about 30 ms.

* * * * *